US011296775B2

(12) United States Patent
Cao et al.

(10) Patent No.: US 11,296,775 B2
(45) Date of Patent: Apr. 5, 2022

(54) MOTION AWARENESS-BASED WIRELESS ACCESS

(71) Applicant: Huawei Technologies Co., Ltd., Shenzhen (CN)

(72) Inventors: Hanwen Cao, Munich (DE); Jian Luo, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 15 days.

(21) Appl. No.: 16/856,942

(22) Filed: Apr. 23, 2020

(65) Prior Publication Data

US 2020/0252120 A1 Aug. 6, 2020

Related U.S. Application Data

(63) Continuation of application No. PCT/EP2017/077232, filed on Oct. 25, 2017.

(51) Int. Cl.
*H04B 7/0408* (2017.01)
*H04B 7/08* (2006.01)
*H04B 7/06* (2006.01)

(52) U.S. Cl.
CPC ......... *H04B 7/0834* (2013.01); *H04B 7/0408* (2013.01); *H04B 7/0626* (2013.01); *H04B 7/0695* (2013.01)

(58) Field of Classification Search
CPC .. H04B 7/0408; H04B 7/0626; H04B 7/0695; H04B 7/0834; H04W 72/1231
See application file for complete search history.

(56) References Cited

U.S. PATENT DOCUMENTS

| 7,116,979 | B2 | 10/2006 | Backes et al. |
| 10,318,890 | B1* | 6/2019 | Kravets ............... G06N 3/0454 |
| 2013/0301619 | A1* | 11/2013 | Singh ................ H04W 56/0045 |
| | | | 370/336 |
| 2014/0179332 | A1 | 6/2014 | Qian et al. |
| 2017/0019837 | A1* | 1/2017 | Katar ................... H04B 17/318 |

FOREIGN PATENT DOCUMENTS

| CN | 106255190 A | 12/2016 |
| CN | 106487475 A | 3/2017 |
| EP | 3185597 A1 | 6/2017 |
| WO | 2010021648 A1 | 2/2010 |
| WO | 2015120628 A1 | 8/2015 |
| WO | 2016188312 A1 | 12/2016 |
| WO | 2017067607 A1 | 4/2017 |

OTHER PUBLICATIONS

Biagiotti, Luigi et al., "Trajectory Planning for Automatic Machines and Robots", Springer-Verlag Berlin Heidelberg, 2008, 515 pages.
Prof. De Luca, Alessandro, "Trajectory planning", Sapienza Universita Di Roma, Dec. 7, 2008, 26 pages.

* cited by examiner

*Primary Examiner* — Minh Trang T Nguyen
(74) *Attorney, Agent, or Firm* — Slater Matsil, LLP

(57) ABSTRACT

A Motion Aware Scheduler (MAS) is configured to obtain, from a controller through an interface, Motion State Information (MSI) for a motion of at least one movable apparatus, also configured to obtain, from a physical layer of a radio node comprising the MAS, Channel State Information (CSI), also configured to associate the CSI and the MSI in order to obtain a mapping information, and also configured to store the mapping information in order to obtain a stored mapping information.

14 Claims, 2 Drawing Sheets

MOTION AWARENESS-BASED WIRELESS ACCESS

CROSS-REFERENCE TO RELATED APPLICATIONS

This application is a continuation of International Application No. PCT/EP2017/077232, filed on Oct. 25, 2017, the disclosure of which is hereby incorporated by reference in its entirety.

TECHNICAL FIELD

The present invention relates to the field of wireless communications, and more particularly to the field of wireless communications in an industrial environment.

BACKGROUND

For industrial automation, wireless connectivity is strongly desired to avoid the physical limitations of length, weight and cost of a cable, and to allow for more flexible and intelligent architecture and process. However, modern and future industrial automation is becoming more and more dynamic and complex, which features a harsh channel environment for wireless communications. Thus, the challenges may be related to an increasing number of metal structures acting as strong channel reflectors, dynamically moving objects in the propagation path, antennas whose location and posture are also very dynamic in terms of polarization and radiation pattern, connected nodes, and millimeter waves (mmWave) whose transmission at mmWave frequencies is vulnerable to blockage. In addition, very stringent requirements, such as low latency (e.g., as low as 50 us), low jitter (e.g., as low as 10 us), high reliability (e.g., packet loss as low as 10e-8 or 10e-9) and high throughput (e.g., up to Gbps) in the Human Machine Interface (HMI) (virtual Reality-VR/Augmented Reality-AR) in production Information Technology (IT), are demanded by industrial communications, which is very challenging to fulfill in such an industrial channel environment.

The harsh wireless channel environment being mainly due to the dynamically moving nature of many machines as well as the strong blockage and reflection characteristics of their metal structures, it has been proven by many activities of channel measurement in industrial environments that there exists a strong connection between motion state and channel state.

Existing solutions to cope with industrial wireless communications are mostly based on a conventional approach of protocol and algorithm designs, as it can be found, for example, in the following documents.

Document WO 2017/067607 A1 discloses a method for operating a communication system of an industrial automation system with multiple radio base stations for real-time data transfer and communication system. Therein, classification and prioritization of traffic types are proposed to make communication more adaptive to the different Quality of Service (QoS) requirements of different data types. However, no motion state is considered in the wireless access.

Document WO 2015/120628 A1 discloses a method of transmitting data frames in a wireless communication system and a wireless access device. Therein, a signal spectral analysis is used to assist channel selection in communication, which is similar to the resource scheduling approach in Long Term Evolution (LTE). However, no motion state is considered in the wireless access.

Document WO 2010/021648 A1 discloses a reliable wireless communication system using adaptive frequency hopping. Therein, the conventional approach of frequency hopping is applied to enhance the robustness over frequency-selective fading channel, which exists in standards like IEEE 802.15.1. However, no motion state is considered in the wireless access.

Document U.S. Pat. No. 7,116,979 B2 discloses a wireless channel selection method and system using scanning for identifying access point. Therein, a movement detection procedure provides seamless roaming of stations between different Access Points (APs). However, this proposal is far away from a link adaptation based on Motion State Information (MSI).

SUMMARY

It is therefore an object of embodiments of the present invention to improve wireless communication, in particular to exploit a relation between Motion State Information (MSI) and Channel State Information (CSI) in order to enhance a wireless link adaptation.

The object is achieved by the features of the independent claims. Further embodiments of the invention are apparent from the dependent claims, the description and the drawings.

According to a first aspect, embodiments of the invention relates to a Motion-Aware Scheduler (MAS) for scheduling a data transmission and/or reception with adaptation to a wireless channel within a wireless communication system. The scheduler (MAS) is configured to obtain, from a controller through an interface, Motion State Information (MSI) for a motion of at least one movable apparatus, also configured to obtain, from a physical layer of a radio node comprising the MAS, Channel State Information (CSI), also configured to associate the CSI and the MSI in order to obtain a mapping information, and also configured to store the mapping information in order to obtain a stored mapping information. Thereby, the mapping of MSI to CSI may be further utilized to enhance the adaptation to the wireless channel, namely to enhance the wireless link adaptation.

According to an implementation form of the first aspect, the scheduler (MAS) is configured to schedule the data transmission and/or reception with channel adaptation parameters based on the stored mapping information and the MSI.

According to a further implementation form of the first aspect, the scheduler (MAS) is configured to create a database in which the mapping information is stored, and also configured to predict the CSI according to the MSI based on the stored mapping information.

According to a further implementation form of the first aspect, the MSI is real-time updated or pre-arranged according to a motion plan, and indicates each motion of the at least one movable apparatus.

According to a further implementation form of the first aspect, the scheduler (MAS) is configured to inform the controller when the MSI has a negative impact on the CSI.

The above object is also solved in accordance with a second aspect.

According to the second aspect, embodiments of the invention relate to a radio node comprising a Motion-Aware Scheduler (MAS) as claimed in the first aspect and any one of the implementation forms of the first aspect.

According to an implementation form of the second aspect, the radio node is configured to measure channel state information (CSI), and also configured to provide the CSI to the MAS.

According to a further implementation form of the second aspect, the radio node is configured to provide parameter information to a controller as specified in the first aspect, wherein the controller provides motion state information (MSI) based on the parameter information to the MAS.

The above object is also solved in accordance with a third aspect.

According to the third aspect, embodiments of the invention relate to a controller (MNC, MTC) for providing motion information (MSI). The controller (MNC, MTC) is configured to obtain parameter information from a radio node as claimed in the second aspect and any one of the implementation forms of the second aspect, and also configured to provide motion state information (MSI) based on the parameter information to a scheduler as claimed in the first aspect and any one of the implementation forms of the first aspect.

The above object is also solved in accordance with a fourth aspect.

According to the fourth aspect, embodiments of the invention relate to a movable apparatus comprising a controller as claimed in the third aspect, wherein the movable apparatus is partly or entirely movable.

The above object is also solved in accordance with a fifth aspect.

According to the fifth aspect, embodiments of the invention relate to a wireless communication system comprising two or more inter-communicating radio nodes as individually claimed in the second aspect and any one of the implementation forms of the second aspect, wherein a wireless channel linking the two or more inter-communicating radio nodes is susceptible of being impacted by at least one movable apparatus as individually claimed in the fourth aspect.

The above object is also solved in accordance with a sixth aspect.

According to the sixth aspect, embodiments of the invention relate to a method for scheduling a data transmission and/or reception with adaptation to a wireless channel within a wireless communication system. The method is performed at a Motion-Aware Scheduler (MAS) and comprises the step of obtaining, from a controller through an interface, Motion State Information (MSI) for a motion of at least one movable apparatus, the step of obtaining, from a physical layer of a radio node, channel state information (CSI), the step of associating the CSI and the MSI in order to obtain a mapping information, and the step of storing the mapping information in order to obtain a stored mapping information.

According to an implementation form of the sixth aspect, the method comprises the step of scheduling a data transmission and/or reception with channel adaptation parameters based on the stored mapping information and the MSI.

According to a further implementation form of the sixth aspect, the method comprises the step of creating a database in which the mapping information is stored, and the step of predicting the CSI according to the MSI based on the stored mapping information.

According to a further implementation form of the sixth aspect, the method comprises the step of informing the controller when the MSI has a negative impact on the CSI.

The above object is also solved in accordance with a seventh aspect.

According to the seventh aspect, embodiments of the invention relate to a method for scheduling a data transmission and/or reception with adaptation to a wireless channel within a wireless communication system. The method is performed at a radio node and comprises the step of obtaining, from a controller through an interface, motion state information (MSI) for a motion of at least one movable apparatus, the step of measuring, at a physical layer of the radio node, channel state information (CSI), the step of associating, at a Motion-Aware Scheduler (MAS) of the radio node, the CSI and the MSI in order to obtain a mapping information, and the step of storing, at the MAS of the radio node, the mapping information in order to obtain a stored mapping information.

According to an implementation form of the seventh aspect, the method comprises the step of providing parameter information to the controller, wherein the controller provides the MSI based on the parameter information to the MAS.

According to a further implementation form of the seventh aspect, the measured CSI comprises information about strongest beam-pairs in terms of signal intensity amongst two or more radio nodes inter-communicating between themselves, each inter-communicating radio node having a respective beam codebook index (CBI).

According to a further implementation form of the seventh aspect, the method comprises the step of performing beam scanning at different motion states, each with a MSI, the step of associating the motion states, in terms of MSI, with the strongest beam-pairs, the step of storing, at the MAS of the inter-communicating radio nodes, the mapping information between the MSI and the beam codebook indexes, and the step of applying the beam codebook indexes associated with the predicted MSI during the data transmission and/or the data reception.

According to a further implementation form of the seventh aspect, the method comprises, for each motion state, the steps of checking and recording a beam blockage status of the strongest beam-pairs, the strongest beam-pairs being either blocked or unblocked, and, based on the recorded beam blockage status and the MSI associated with the beam codebook indexes of the strongest beam-pairs, the step of selecting, at the MAS of the inter-communicating radio nodes, the unblocked strongest beam-pairs.

The above object is also solved in accordance with an eighth aspect.

According to the eighth aspect, embodiments of the invention relate to a method for providing motion state information (MSI). The method is performed at a controller and comprises the step of obtaining, from a radio node, parameter information, and the step of providing the MSI based on the parameter information to the radio node.

The above object is also solved in accordance with a ninth aspect.

According to the ninth aspect, embodiments of the invention relate to a computer program product comprising a program code for performing a method according to any one of sixth, seventh and eighth aspects and their respective implementation forms when executed on a computer. Thereby, the method can be performed in an automatic and repeatable manner.

The computer program can be performed by the above apparatuses.

More specifically, it should be noted that all the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the Internet.

It shall further be understood that embodiments of the invention can also be any combination of the dependent claims or above embodiments with the respective independent claim.

BRIEF DESCRIPTION OF THE DRAWINGS

In the following detailed portion of the present disclosure, embodiments of the invention will be explained in more detail with reference to the exemplary embodiments shown in the drawings, in which.

Identical reference signs are used for identical or at least functionally equivalent features unless otherwise indicated.

DETAILED DESCRIPTION OF ILLUSTRATIVE EMBODIMENTS

Figure 1:
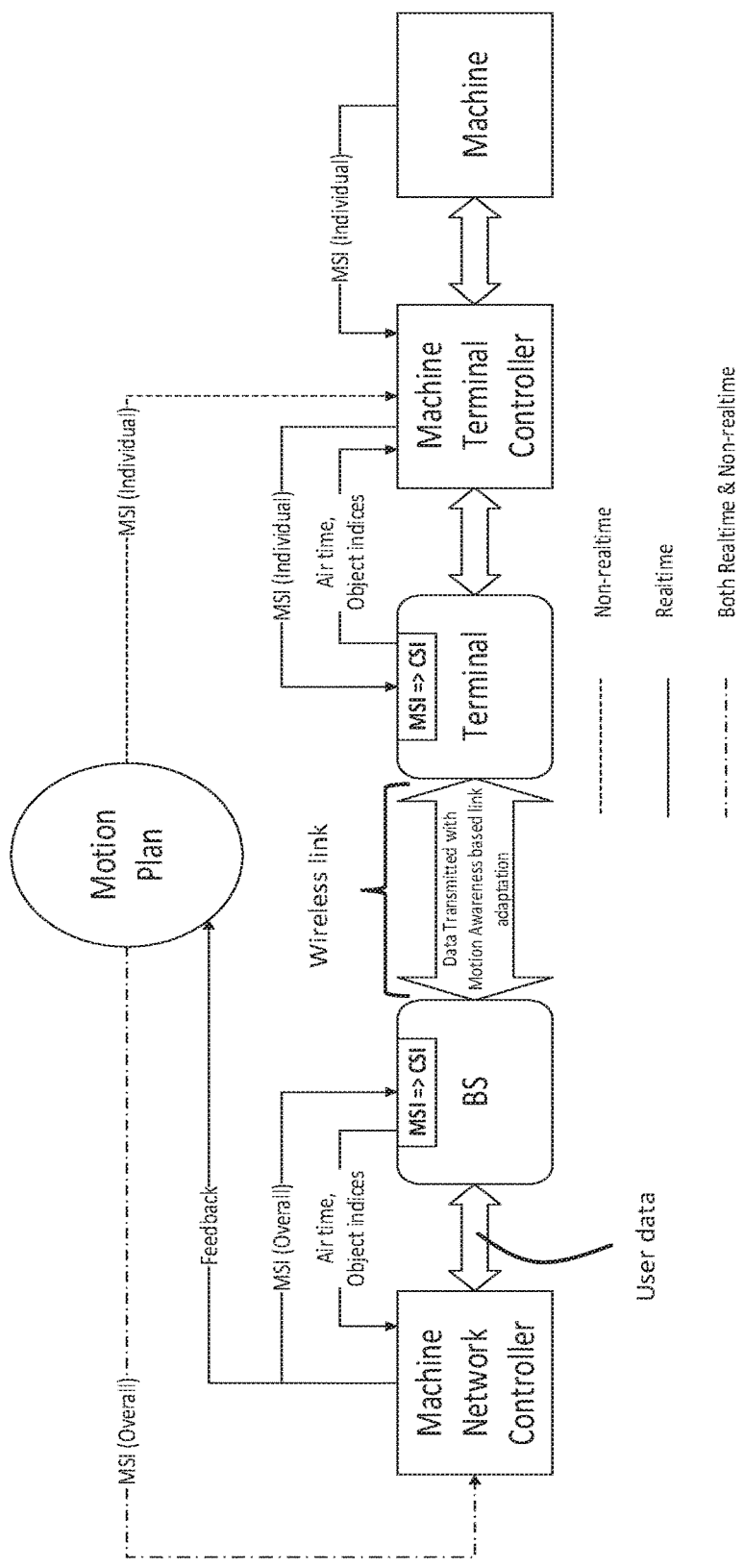
FIG. 1 shows a MSI-to-CSI based wireless communication system 100 within an industrial environment featured by a machine, according to an embodiment of the present invention.

FIG. 1 shows a MSI-to-CSI based wireless communication system 100 within an industrial environment featured by a machine, according to an embodiment of the present invention.

As depicted, the wireless communication system 100 comprises two inter-communicating radio nodes (e.g., a terminal such as a User Equipment (UE), and a Base Station (BS) such as a Node B and an enhanced/evolved Node B (eNodeB or eNB)), which communicate with each other in uplink or downlink direction through a wireless link and are connected to a movable apparatus, e.g., a machine entirely movable or partly movable, which is susceptible to impact a quality of the wireless link through its motion and/or its metal structure. It shall be noted that the wireless communication system 100 is an exemplary system that is limited to two inter-communicating radio nodes and one machine merely for the sake of clarity and simplification. In a more general embodiment, the system may be extended to more than two inter-communicating radio nodes and more than one machine.

In the present embodiment of FIG. 1, the terminal and the BS obtain MSI from a respective controller (e.g., a Machine Terminal Controller (MTC) for the terminal and a Machine Network Controller (MNC) for the BS) of the connected machine, and associate it with CSI measured by the terminal and the BS, before performing a link adaptation accordingly.

The MSI, provided by the MTC and the MNC, may comprise, in a non-limitative manner, information about an angle, a speed, a radius and a location of the connected machine. In addition, the MSI may be either real-time updated or pre-arranged according to a Motion Plan (MP) as schematically depicted. The Motion Plan (MP) may stand for a regular pattern and some basic principles of machine motions within a long time scale, and be changeable by the feedback from the MNC according to the overall status of the network of the connected machines. Based on information from the MP, the machine controller may then provide predicted MSI at a later air time, the air time being defined as the time when a radio signal is being transmitted between the transmitter and the BS through the wireless link.

The CSI, provided by the terminal and the BS, may be split into explicit information and inexplicit or implicit information. The explicit one may comprise, in a non-limitative manner, information about path loss, Channel Impulse Response (CIR) and Doppler spread. The implicit one may comprise, in a non-limitative manner, information about Channel Quality Indicator (CQI), Rank Indicator (RI) and Codebook Index (CBI).

The terminal and the BS may provide parameter information to respective MTC and MNC, in order to get proper MSI. The parameter information may comprise, in a non-limitative manner, information about object index or address, air time and other relevant parameters.

The link adaption may, in a non-limitative manner, consist of a Modulation Coding Scheme (MCS) selection, numerology (e.g., subcarrier spacing, transmission time interval (TTI), cyclic prefix (CP) length), a time/frequency/spatial resource selection and a multi-antenna precoding in the case of radio beam selection.

Figure 2:
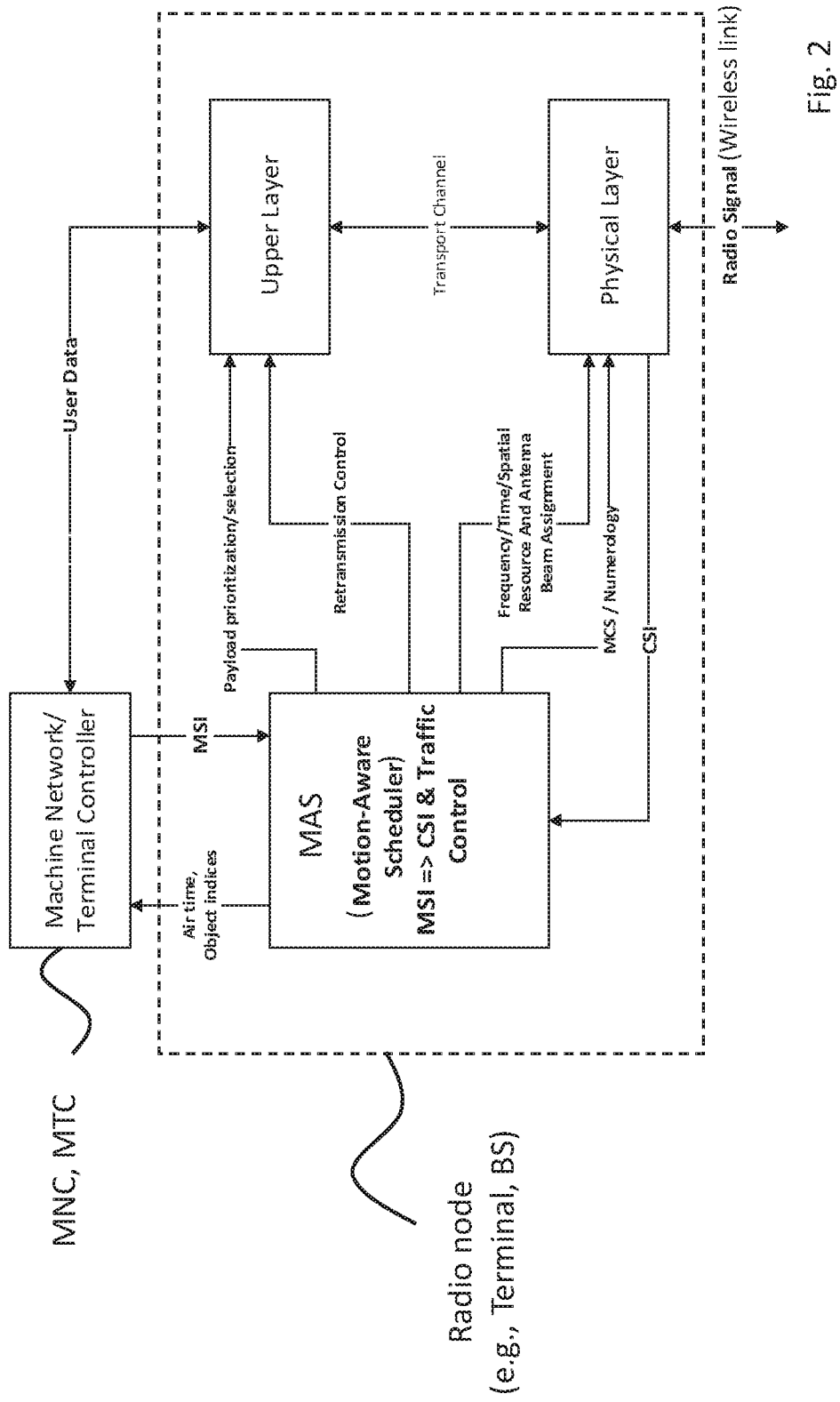
FIG. 2 shows an information flow inside a radio node (e.g., terminal, BS) illustrating how the MSI provided by a machine controller is guiding the link adaptation control, according to an embodiment of the present invention.

FIG. 2 shows an information flow inside a radio node (e.g., terminal, BS), which illustrates how the MSI provided by a machine controller is guiding the link adaptation control, according to an embodiment of the present invention.

As also depicted in FIG. 1, the radio node (e.g., terminal, BS) provides the parameter information (e.g., object index or address, air time and other relevant parameters) to the machine controller (e.g., MTC, MNC), and the machine controller provides the MSI based on the parameter information to the radio node, thereby allowing the provision of a proper MSI.

As shown in FIG. 2, the radio node may comprise a scheduler, hereafter designated as Motion-Aware Scheduler (MAS), which is the center of prediction of the CSI based on the MSI input and the following control actions applied to the lower (e.g., physical (PHY)) layer and upper layer of the radio node. With respect to the lower layer, the MAS may specify, for example, a modulation and coding scheme (MCS), a numerology, a frequency/time/spatial resource selection and a multi-antenna beam assignment or selection. With respect to the upper layer, the MAS may perform, based on user data exchanged with the machine controller, for example, adaptive retransmission controls and a payload prioritization and selection.

Assume an environment with N movable apparatuses or objects (e.g., movable machines), M wireless terminals and K BS, where N, M, K are greater than or equal to unity. Let $\vec{\mu}\_n(\tau)$ be the MSI vector variable of a movable object n (i.e., an nth movable object) at a time $\tau$, $\vec{\gamma}\_((m,k))$ be the CSI vector variable of the channel between a wireless terminal m (i.e., a mth terminal) and a BS k (i.e., a kth BS). Based on the used notation, the MSI-based CSI prediction may be mathematically represented by a MSI-to-CSI mapping function $f_k$ and formulated as follows:

$$\{\vec{\gamma}\_((1,k)), \vec{\gamma}\_((2,k)), \ldots, \vec{\gamma}\_((M,k))\} = f\_k(\{\vec{\mu}\_1(\tau), \vec{\mu}\_2(\tau), \ldots, \vec{\mu}\_N(\tau)\}, \beta) \quad (1)$$

where $\beta$ denotes an optional frequency channel index.

As aforementioned, the CSI may be explicit or implicit. In the particular case of a mm-wave communication, the CSI may be simplified into information about a certain number of the strongest Tx-Rx beam-pairs (i.e., Tx-Rx beam-pairs with the best signal intensity) during a data transmission (Tx) and/or a data reception (Rx) between the terminal and the BS, for example, in terms of beam codebook indexes.

To collect the MSI-to-CSI mapping information, a channel measurement-based training may be carried out, for example, according to the following three options.

In the first option, the radio node (e.g., terminal, BS) may measure the CSI of all MSI vector variable combinations ($\vec{\mu}\_1\ (\tau), \vec{\mu}\_2\ (\tau), \ldots, \vec{\mu}\_N\ (\tau)$). To that extent, the movable objects may go through all possible motions (i.e., according to all MSI vector variable combinations), while for each motion, the CSI is measured and stored. In the particular case of the mm-wave communication, for each motion, the best Tx-Rx beam pairs may be recorded, for example, in terms of beam codebook indexes. Such full measurements may be achieved periodically or triggered by certain events such as a change in the factory configuration (e.g., new placement of machines, use of new machines), a degradation of the link performance (e.g., due to mismatch of MSI-CSI mapping), a timeout of a predefined period and so on.

In the second option, the collection of MSI-to-CSI mapping information may be performed during a "normal" operation. Once a CSI measurement has been made through, for example, a channel estimation, the corresponding MSI information may be recorded and paired with the measured CSI. After some time, the radio node will collect all or most of the needed MSI-CSI information.

In the third option, the MSI-to-CSI mapping information may also be collected during a "normal" operation like in the second option, but, in the meantime, the radio node may regularly check any missing MSI-to-CSI mapping information and then decide to carry out further dedicated measurements to obtain the missing MSI-to-CSI information. Again, after some time, the radio node will then collect all or most of the needed MSI-CSI information.

In any option, the collected MSI-to-CSI mapping information may be stored in the MAS of the radio node so as to create a database.

To reduce the data volume in signaling and storage, it shall be noted that implicit CSI (e.g., information about CQI, RI and CBI) may be preferred to explicit CSI (e.g., information about path loss, CIR and Doppler spread).

To reduce the search complexity, it shall be noted that the database may be a Look-Up Table (LUT). In addition, to reduce any data overhead, the database may further ignore a movable object or a specific motion state of the movable object that has an insignificant impact on the wireless channel.

In the particular case of the mm-wave communication and to reduce any signaling overhead (e.g., in the CSI feedback), it shall be noted that only the dynamic blockage due to a motion of the movable object may be measured. From a signaling point of view, the information format may be, for example, MSI, beam-pair-ID, blockage indicator. For this purpose, it may be assumed that the radio nodes (e.g., the BS and multiple terminals) have a respective beam codebook index (CBI) for the data transmission (Tx) and/or the data reception (Rx). In a first step, a Tx-Rx beam scanning amongst the BS and all terminals is performed at a default MSI or different MSIs or motion states of the movable object. In a second step, the motion states, in terms of MSI, are associated with the strongest beam-pairs (i.e., the beam pairs with the best signal intensity), and the resulting mapping information between the MSI and the beam codebook indexes are stored in the MAS of the inter-communicating radio nodes. In a third step, the beam codebook indexes associated with the predicted MSI are then applied during the data transmission (Tx) and/or the data reception (Rx). In the event that the beam scanning and the strongest beam selection have not been done for all MSI's (in practice, it is only done for a default MSI), the MAS may then arrange a beam scanning procedure only among the strongest beam pairs (e.g., of a default MSI) for the rest of the MSI's. In that case, the next fourth and fifth steps are needed. Thus, in the fourth step, for each of such motion states, a beam blockage status of the strongest beam-pairs is checked and recorded, the strongest beam-pairs being either blocked (i.e., status: blocked) or unblocked (i.e., status: unblocked). Then, in the fifth step, based on the recorded beam blockage status and the MSI associated with the beam codebook indexes of the strongest beam-pairs, the MAS of the inter-communicating radio nodes selects the unblocked strongest beam-pairs. Thereby, the MAS may predict the blockage of the selected strongest beam-pairs based on the mapping of the recorded blockage to the MSI mapping and on the MSI provided by the machine controller.

Furthermore, it shall be noted that the MAS may also inform the machine controller about those MSI's that have a negative impact on CSI. Such a negative impact may be, for example, related to critical MSI leading to a bad status of the wireless channel. The machine controller may then feed the received critical MSI back to the motion plan, which may thereby modify the motion scheduling and ensure that the movable machine avoids this critical MSI that results in a bad channel status.

In summary, embodiments of the present invention relate to a Motion-Aware Scheduler (MAS) for scheduling a wireless transmission and/or reception with adaptation to a wireless channel within a wireless communication system. The MAS is configured to obtain, from a controller through an interface, Motion State Information (MSI) for a motion of at least one movable apparatus, also configured to obtain, from a physical layer of a radio node comprising the MAS, Channel State Information (CSI), also configured to associate the CSI and the MSI in order to obtain a mapping information, and also configured to store the mapping information in order to obtain a stored mapping information. Thus, the invention establishes the framework of exploiting the mapping of MSI to CSI, which may be further utilized to enhance the wireless link adaptation.

While embodiments of the present invention have been illustrated and described in detail respectively in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention

What is claimed is:

1. A device comprising:
a processor; and
a non-transitory computer-readable storage medium storing a program to be executed by the processor, the program including instructions to:
schedule a data transmission or reception with adaption to a wireless channel within a wireless communication system;
obtain, from a controller through an interface, Motion State Information (MSI) for a motion of a movable apparatus, wherein the MSI comprises information of a speed and information of a direction of the movable apparatus;
obtain, from a physical layer of a radio node comprising the device, Channel State Information (CSI);
associate the CSI and the MSI to obtain mapping information; and
store the mapping information to obtain stored mapping information.

2. The device of claim 1, wherein the instructions comprise further instructions to:
schedule the data transmission or reception with channel adaptation parameters according to the stored mapping information and the MSI.

3. The device of claim 2, wherein the instructions comprise further instructions to:
create a database storing the mapping information; and
predict an updated CSI according to the MSI and the stored mapping information.

4. The device of claim 3, wherein:
the MSI is real-time updated or pre-arranged according to a motion plan; and
the MSI indicates each motion of the movable apparatus.

5. The device of claim 4, wherein the instructions comprise further instructions to:
inform the controller when the MSI has a negative impact on the CSI.

6. A method, comprising:
scheduling, by a Motion Aware Scheduler, a data transmission or reception with adaption to a wireless channel within a wireless communication system by:
obtaining, from a controller through an interface, Motion State Information (MSI) for a motion of a movable apparatus, wherein the MSI comprises information of a speed or information of a direction of the movable apparatus;
obtaining, from a physical layer of a radio node, channel state information (CSI);
associating the CSI and the MSI to obtain mapping information; and
storing the mapping information to obtain stored mapping information.

7. The method of claim 6, wherein scheduling, by the Motion Aware Scheduler, the data transmission or reception with adaption to the wireless channel within the wireless communication system comprises:
scheduling the data transmission or reception with channel adaptation parameters according to the stored mapping information and the MSI.

8. The method of claim 7, further comprising:
creating a database storing the mapping information; and
predicting an updated CSI according to the MSI and the stored mapping information.

9. The method of claim 8, further comprising:
informing the controller when the MSI has a negative impact on the CSI.

10. A method comprising:
scheduling, by a radio node, a data transmission or reception with adaption to a wireless channel within a wireless system by:
obtaining, from a controller through an interface, motion state information (MSI) for a motion of a movable apparatus, wherein the MSI comprises information of a speed and information of a direction of the movable apparatus;
measuring, at a physical layer of the radio node, channel state information (CSI);
associating, at a Motion-Aware Scheduler (MAS) of the radio node, the CSI and the MSI to obtain mapping information; and
storing, at the MAS of the radio node, the mapping information to obtain stored mapping information.

11. The method of claim 10, further comprising:
providing parameter information to the controller, wherein the controller provides the MSI according to the parameter information to the MAS.

12. The method of claim 11, wherein:
the CSI comprises information about strongest beam-pairs in terms of signal intensity amongst a plurality of radio nodes inter-communicating between themselves, each of the plurality of radio nodes having a respective beam codebook index.

13. The method of claim 12, further comprising:
performing beam scanning at different motion states, each of the motion states having respective MSI;
associating each of the motion states, in terms of MSI, with the strongest beam-pairs;
storing, at a respective MAS of each of the plurality of radio nodes, mapping information of the respective MSI of the motion states and beam codebook indexes; and
applying beam codebook indexes associated with a predicted MSI during the data transmission or reception.

14. The method of claim 13, further comprising:
for each of the motion states, checking and recording a beam blockage status of the strongest beam-pairs to obtain a recorded beam blockage status, each of the strongest beam-pairs being either blocked or unblocked; and
according to the recorded beam blockage status and a MSI associated with the beam codebook indexes of the strongest beam-pairs, selecting, at the respective MAS of each of the plurality of radio nodes, a strongest beam-pair of the strongest beam-pairs that is unblocked.

* * * * *